Figure 1:
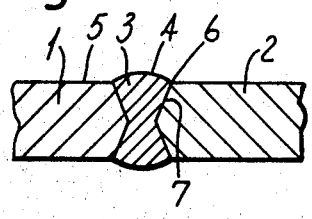

United States Patent [19]

Fawcett

[11] 4,318,966
[45] Mar. 9, 1982

[54] WELDED STRUCTURES

[75] Inventor: Richard Fawcett, Stockton-on-Tees, England

[73] Assignee: Imperial Chemical Industries Limited, London, England

[21] Appl. No.: 135,686

[22] Filed: Mar. 31, 1980

[51] Int. Cl.³ ............................................. B23K 35/00
[52] U.S. Cl. ................................ 428/683; 228/263 R; 428/582; 428/685
[58] Field of Search ........... 228/175, 189, 214, 263 D, 228/225, 151, 165, 226, 245, 249, 250, 251; 403/272; 428/582, 594, 683, 685

[56] References Cited

U.S. PATENT DOCUMENTS 2,759,249  8/1956  Eberle .......................... 228/263 D X
2,963,129  12/1960  Eberle .......................... 228/263 D X

FOREIGN PATENT DOCUMENTS 774967  5/1957  United Kingdom .
145945  7/1962  U.S.S.R. ................................ 228/249

Primary Examiner—John McQuade
Assistant Examiner—John S. Brown
Attorney, Agent, or Firm—Cushman, Darby & Cushman

[57] ABSTRACT

Compensation is provided in a welded structure formed from dissimilar metals e.g. carbon steel and stainless steel for knife-line corrosion occurring at the interface between the dissimilar metals by making the length of the path along which knife-line corrosion is liable to occur between the metals towards the load bearing area of the weld exceed the expected extent of knife-line corrosion over the design life of the structure. The interface exposed to the corrosive environment may be displaced from the load bearing region of the weld by providing a layer of metal e.g. the weld metal over, and fused to the surface of the one of the components with which the metal of the layer forms a knife-line corrodable combination. That surface may include the surface of an appendage integral with or welded to the component.

7 Claims, 11 Drawing Figures

WELDED STRUCTURES

This invention relates to welded structures and in particular to welded metal structures that are intended for use in a corrosive environment.

While it is clearly desirable to use metals that are resistant to corrosion, for economic or other reasons this is no always possible.

When a structure is designed, the thickness of the components is determined not only by the intended load bearing requirements and the strength of the metal employed, but also by the amount of corrosion anticipated during the life of the structure, so that, in spite of corrosion, the structure will still have adequate strength at the end of its design life.

In some structures it is necessary to weld together components of different metals. With some metal combinations, if the welded junction between the metals is exposed to a corrosive environment, accelerated corrosion at that exposed junction tends to occur producing what is known as knife-line corrosion down the interface between the two metals from the exposed junction.

With other metal combinations, particularly where the metals are similar to one another knife-line corrosion does not occur, or only occurs to an insignificant extent: thus knife-line corrosion is liable to occur at a stainless steel/carbon steel junction but may be insignificant at a junction between two different stainless steels or between two different carbon steels. In the present specification the term knife-line corrodable combination is utilised where the metals are ones between which a junction is liable to significant knife-line corrosion.

The extent of knife-line corrosion in a knife-line corrodable metal combination may be several times the normal anticipated corrosion at areas away from the junction between the metals. For example, in the case of a carbon steel/stainless steel junction, whereas the normal anticipated corrosion of the carbon steel component over the design life of the structure may extend to a depth of 2-3 mm from the component surface, the extent of knife-line corrosion occuring at the carbon steel/stainless steel interface over the same period may be 1-2 cm or more.

Clearly, unless measures are taken to counter the effect of such knife-line corrosion, the life of the structure will be greatly reduced. In some cases knife-line corrosion can be avoided by providing the surface of the structure with a protective coating: however such coatings require maintenance and in some applications may not be satisfactory for other reasons.

In the present invention these problems are reduced by arranging the weld configuration so that the length of the path along which knife-line corrosion takes place from the metal-metal junction exposed to the corrosive environment is increased.

Accordingly we provide a welded structure, for use in a corrosive environment, including a weld between components formed from metals of a knife-line corrodable metal combination, in which each path liable to knife-line corrosion, from the corrosive environment, to each metal-metal junction in the load bearing region of the weld that is liable to knife-line corrosion, has a length at least equal to the anticipated extent of knife-line corrosion along that path during the design life of the structure.

Considerations of strength are the main criteria in arriving at the design of a conventional weld, whether or not it is between the metals of a knife-line corrodable combination and the weld configuration that would conventionally be utilised to give the requisite strength is herein considered to be the load bearing region of the weld.

In the present invention, the length of the path of knife-line corrosion from the metal-metal junction exposed to the corrosive environment to this load bearing region of the weld is in an excess of the extent of the anticipated knife-line corrosion occuring during the design life of the welded structure, and preferably has a length of at least 2 cm.

Thus in designing a welded structure in accordance with the invention, it is first necessary to determine the weld configuration necessary to give the requisite strength in the absence of knife-line corrosion. In this way the load bearing region of the weld is determined. It is then necessary to modify the design to compensate for knife-line corrosion.

In formulating the design of the welded structure, allowance is normally made for the effects of normal corrosion, generally by increasing the thickness of the components. Thus, where strength considerations dictate that the thickness of a given component is x units, and the expected rate of normal corrosion is y units per year, if the design life is n years, the component thickness is made in excess of $x + ny$ units.

The rate of knife-line corrosion between the two metals under consideration can be determined and this will indicate the expected extent of knife-line corrosion during the n years life of the welded structure, and hence determine the minimum extent by which the exposed junction between the metals is to be displaced from the load bearing region of the weld.

Welds between two dissimilar metals are often made employing a welding metal, e.g. from a welding rod, that is similar to one of the two dissimilar metals. In this case generally little or no knife-line corrosion will occur between the welding metal and the metal that is similar to the welding metal. The metal-metal junction that has to be protected from the knife-line corrosion is thus that one between the welding metal and the metal that is dissimilar thereto. However, in some cases, the junction between the welding metal and the metal similar thereto may also be subject to knife-line corrosion and so, in this case, that junction must also be protected so that the knife-line corrosion does not reach the load bearing region of the weld.

Protection of the junction in the load bearing region of the weld between a knife-line corrodable combination of metals may be effected by providing a layer of one of the metals, or of a metal which does not form a knife-line corrodable combination with that one of the metals, over, and continuously welded to, the other of said metals from the load bearing region of the weld for a distance at least equal to the anticipated extent of knife-line corrosion between said layer and said other of said metals.

This layer of metal may simply be an overlay of the weld metal or of another metal which does not form a knife-line corrodable combination with the weld metal.

The overlay may be an overlay over part of the surface of the one of the components to be welded together with the metal of which the overlay metal forms a kinfe-line corrodable combination: the overlay should extend for such a distance that the length of the welded junction between the overlay metal and the component, with which it forms a knife-line corrodable combination, from the point of exposure to the corrosive environment to the load bearing region of the weld is in an excess of the anticipated extent of knife-line corrosion. Thus during the design life of the structure knife-line corrosion can take place along the length of this welded junction between the component surface and the overylay metal but, because of the displacement of the point of exposure of the junction to the corrosive environment from the load bearing region of the weld, the knife-line corrosion will not reach the load bearing region of the weld during the design life of the structure.

The surface of the component on to which the overlay is formed may include at least part of the surface of an appendage integral with, or welded to, said component; where said appendage is not integral with said component it should be made from a metal that does not form a knife-line corrodable combination with the weld metal used to weld said appendage to said component and that weld metal in turn should not form a knife-line corrodable combination with the metal of said component.

In a preferred form of the invention the appendage comprises a bimetallic strip one face of which is welded to said component by means of weld metal that does not form a knife-line corrodable combination with the metal of that one face or with the metal of said component. In this case the overlay metal is applied so that it covers all of the surface of the component between the load bearing region of the weld and the appendage and at least part of the other face of the bimetallic strip, said other face of the bimetallic strip being of a metal with which said overlay metal does not form a knife-line corrodable combination so that, in effect, said other face of the bimetallic strip becomes part of the protection layer.

Figure 2:
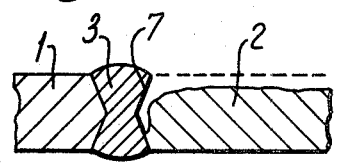
Figure 3:
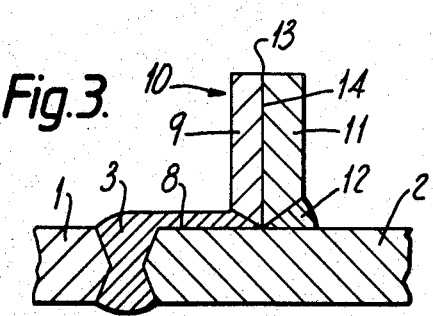
Figure 4:
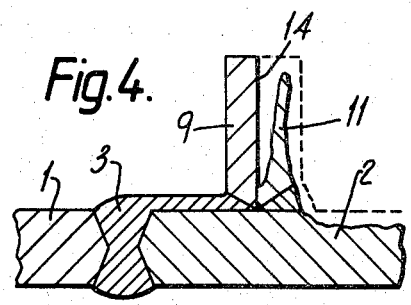
Figure 8:
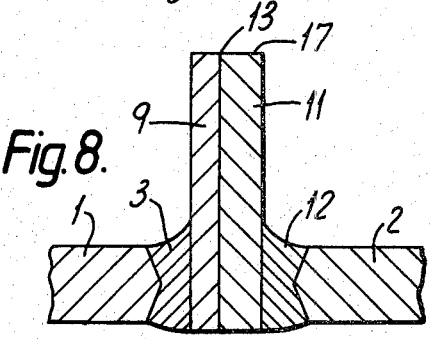
Figure 9:
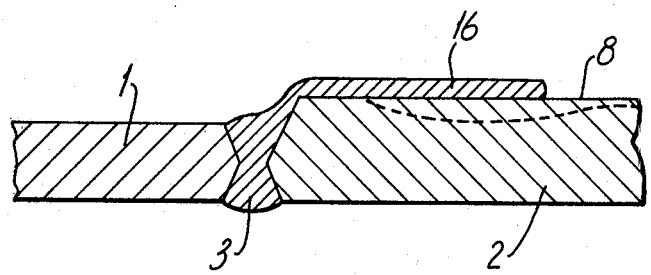
Figure 10:
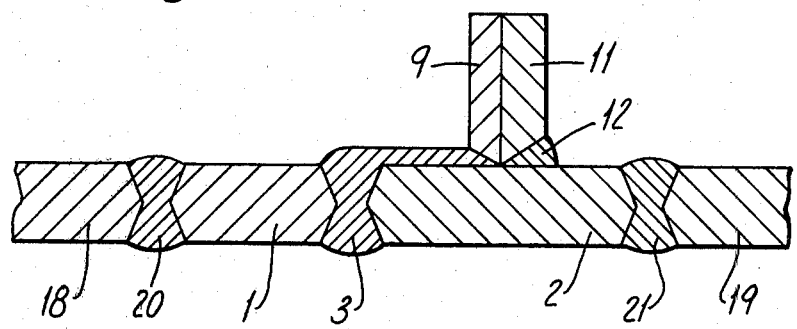
Figure 11:
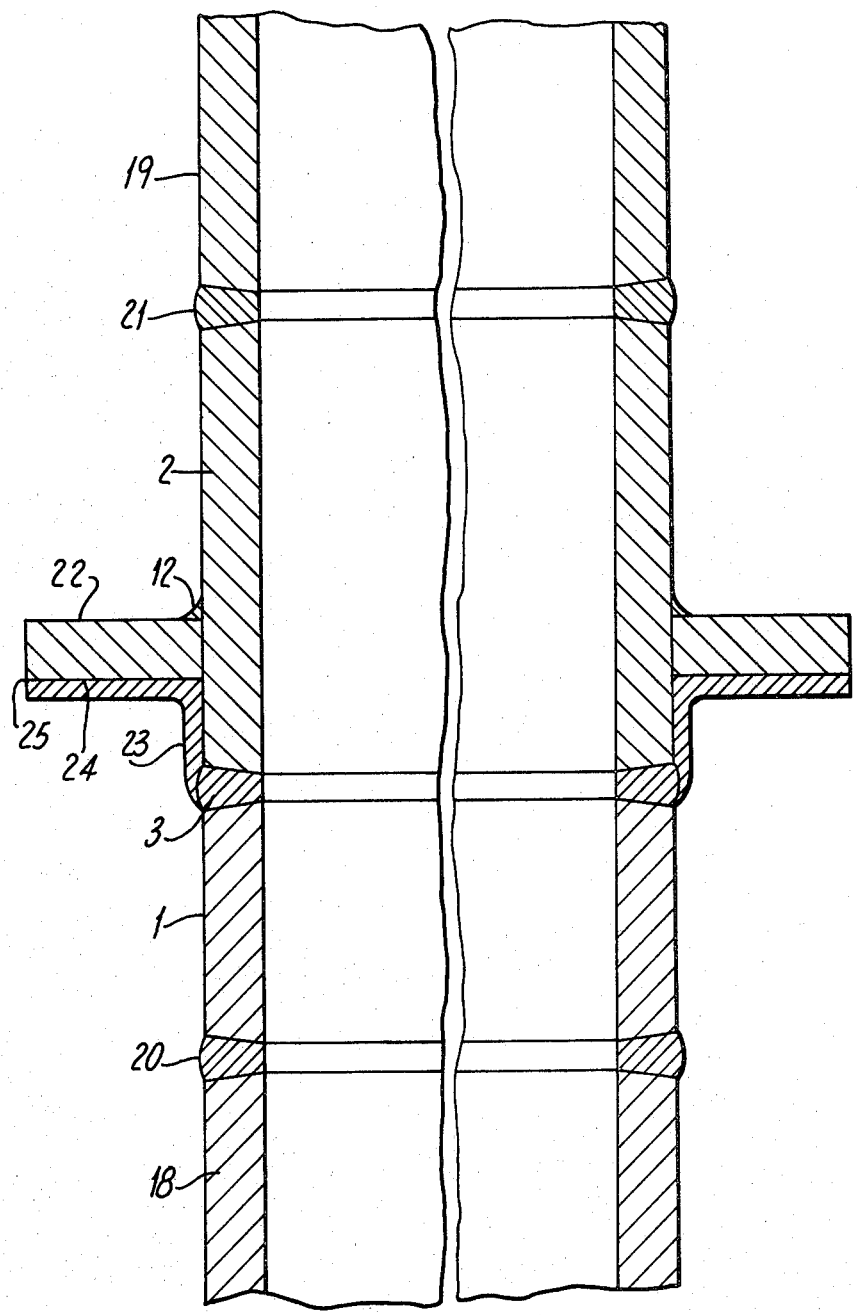

Various embodiments of the invention will now be described with reference to the accompanying drawings wherein FIGS. 1 and 2 are cross sections through a conventional weld before and after corrosion, FIGS. 3 and 4 are views similar to FIGS. 1 and 2 showing a preferred embodiment of the invention, FIGS. 5 to 9 are views similar to FIG. 1 showing alternative embodiments of the invention, FIG. 10 is a view similar to FIG. 3 showing the application of the embodiment of FIG. 3 in a prefabricated jointing member, FIG. 11 is a cross section similar to FIG. 10 showing an application of the invention to welding together tubes of dissimilar metals.

In FIG. 1 there is shown a butt weld between two components 1, 2 composed of dissimilar metals e.g. stainless steel and carbon steel respectively. The components 1, 2 are welded together using a weld metal 3 of a type suitable for welding the dissimilar metals. The manufacturers of the metals from which the components are made normally recommend suitable welding metals. In these embodiments we assume that the welding metal 3 is the same as the metal of component 1 or is a metal that does not form a knife-line corrodable combination with the metal of component 1. Normal design considerations, e.g. strength, require the weld to have the configuration shown, i.e. with the weld metal 3 filling the space between components 1,2 with, perhaps, a slightly raised surface 4 in the vicinity of the weld.

In use, the upper surface 5 of the structure is exposed to a corrosive environment. After a period of time, the structure corrodes: it is here assumed for simplicity that the corrosion of component 1 and of the weld metal 3, is negligible compared with the corrosion of component 2. The corrosion takes two forms, firstly the normal corrosion of the surface 5 resulting in a reduction of thickness of component 2, and secondly, knife-line corrosion starting at the exposed junction 6 between the weld metal 3 and the metal of component 2.

A typical corroded structure is illustrated in FIG. 2 where the original configuration is depicted by dotted lines. It is seen that, as the extent of knife-line corrosion occuring along the interface 7 between the two metals greatly exceeds that of the normal corrosion of the surface of component 2, the weld will fail at the junction of the dissimilar metals long before failure of the component 2 as a result of normal corrosion.

In the embodiment of the invention shown in FIG. 3 however, the weld between the two components 1, 2 is of similar configuration, and has essentially the same load bearing region, as that of the weld in FIG. 1. The weld configuration differs however from that of FIG. 1 in that the weld metal 3 is continued over the surface 8 of component 2 to contact and weld with one face 9 of an appendage in the form of a bimetallic strip 10 coextensive with the length of the weld between components 1 and 2. Strip 10 is of welded laminate construction made, for example, by explosive welding; that side 9 of the strip nearest the weld between components 1 and 2 is made of the same metal as component 1, or of the same metal as weld metal 3, or of a metal that does not form a knife-line corrodable combination with weld metal 3. The other face 11 of the bimetallic strip 10 is welded to component 2 by a weld 12 of the same metal as component 2 or of a metal that does not form a knife-line corrodable combination with the metal of component 2. Side 11 of the bimetallic strip 10 is formed from a metal, e.g. the same metal as component 2, that does not form a knife-line corrodable combination with the metal used for weld 12. The pathway between the metals that is liable to knife-line corrosion is exposed to the corrosive environment at 13 and so has a length corresponding to the width of strip 10 plus the lateral distance between the strip 10 and the junction between component 2 and the weld metal 3 in the space between components 1 and 2.

As is seen from FIG. 4, knife-line corrosion occurs down the interface 14 between the sides of strip 10 and so is well removed from the load bearing region of the weld.

It will be appreciated that the strip 10 must be of such size, and displaced from the weld by such an extent that the knife-line corrosion will not reach the load bearing region of the weld between components 1 and 2 during the design life of the structure.

Figure 5:
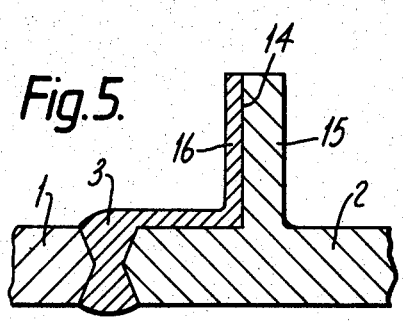

In FIG. 5 a modification of the system of FIG. 3 is shown: here, instead of utilising a bimetal strip 10, an integral flange 15 of component 2 is used as an appendage over one face of which is provided an overlay 16 of the weld metal 3.

As shown in FIGS. 3 to 5, it is preferred that the interface 14 between the metals at the appendage is laterally displaced from the line of the weld so that stress concentration produced by knife-line corrosion is displaced from the line of the weld.

Figure 6:
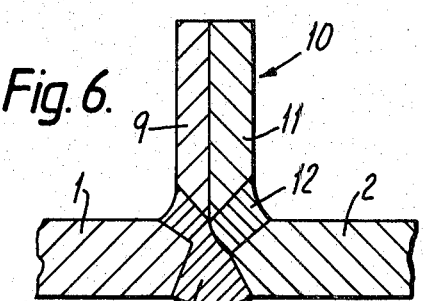

However, in some cases, particularly where the weld is not stressed or only lightly stressed, it is not necessary to displace the interface from the line of the weld. Thus, as shown in FIG. 6, the appendage may take the form of a laminated strip 10 incorporated into, and extending out of, the weld between components 1 and 2, with the side 11 of the strip welded to component 2 with weld metal 12 being of a metal that does not form a knife-line corrodable combination with weld metal 12 and with the metal of component 2.

Figure 7:
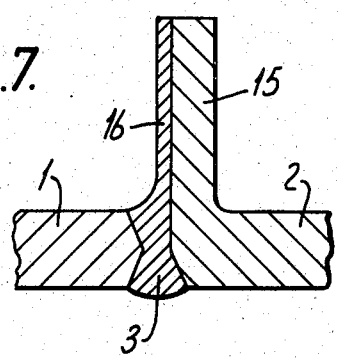

Alternatively, as shown in FIG. 7, the appendage consists of a flange 15 integral with component 2 having an overlay 16 of the weld metal 3 on the side thereof nearer to component 1.

In the embodiment of FIG. 8, the components 1, 2 are welded to opposite faces 9, 11 respectively, of a welded bimetallic strip 10 co-extensive with the length of the desired joint. Face 9 of strip 10 is welded to component 1 with weld metal 3, while face 11 is welded to component 2 with weld metal 12. In this case the load bearing region of the weld is deemed to be that area of the weld between faces 9 and 11 of strip 10, including the area immediately between components 1 and 2, that is necessary to give the required weld strength. The exposed junction 13 between the dissimilar metals is thus displaced from the load bearing area by the distance from the edge 17 of the strip to the edge of the load bearing area.

In the embodiment of FIG. 9, component 2, or at least the end thereof adjacent component 1, is of stouter construction than would normally be required and the exposed junction between the two metals is displaced from the load bearing region of the weld by merely providing an overlay 16 of the weld metal 3 over the surface 8 of component 2. The reason for requiring a greater thickness for the end of component 2 is that during the knife-line corrosion, the metal of component 2 is eaten away to a greater depth than would normally occur. The configuration after corrosion is typically as indicated by the dotted line in FIG. 9.

In some cases, particularly in chemical plant construction, it may be desirable to fabricate, as a separate unit, a jointing component in accordance with the present invention by welding components of dissimilar metals together with a knife-line corrosion displacing member appropriately positioned, and then to weld the appropriate sides of this jointing component to the components made from the dissimilar metals with conventional welds. Such an arrangement is shown in FIG. 10 where two components 18, 19 made of dissimilar metals are connected by a jointing component fabricated in accordance with the configuration of FIG. 3. Component 18 is welded to component 1 of the jointing component by weld metal 20 which does not form a knife-line corrodable combination with either of the metals of components 1 and 18. Component 19 is welded to component 2 of the jointing components by weld metal 21. Again weld metal 21 is one that does not form a knife-line corrodable combination with either of the metals of components 2 and 19. This method of manufacture has the advantage that the special welds can be performed under more controlled conditions while only normal welds, between components 1 and 18, and between components 2 and 19, have to be performed on site.

In the foregoing description it is assumed that the structure is only exposed to a corrosive environment on one side thereof. It will be appreciated that where both surfaces are exposed to a corrosive environment, it is desirable that the exposed metal-metal junctions are displaced from the load bearing region of the weld on both exposed surfaces. Furthermore, in the foregoing description it is assumed that the corrosive environment has little or no effect on one of the metals employed: where both metals are liable to corrosion, the same principles of displacement of the exposed metal-metal junction apply. It is also apparent that the thicknesses of the metal layer or layers used to displace the exposed junction should be such that normal corrosion does not remove this layer or layers at any point to such an extent that the layer or layers are eroded down to the interface between the metals before the knife-line corrosion has reached that point.

In the foregoing description, butt welds have been described: it will however be apparent that the invention can be applied to other weld forms.

The invention is of use wherever knife-line corrosion is liable to take place at a welded joint between dissimilar metals. It is of particular interest when welding stainless steel to carbon steel (in which case the weld metal is usually a stainless steel) but can also be used to advantage between other metal combinations, e.g. when welding carbon steel to nickel or to high nickel alloys.

The invention is of particular merit in the construction of chemical plant, particularly for items that cannot be satisfactorily protected from corrosion by methods such as the application of a protective coating. Such instances arise where it is desired to use a sealed vessel and so maintenance operations on the interior is expensive and gives rise to loss of production. The invention is of particular utility in the construction of fermentation apparatus where the vessel is liable to corrosive attack by the fermentation medium which is often an aerated aqueous solution of inorganic salts. The use of welded joints for joining dissimilar metals, such as those forming knife-line corrodable combinations, instead of sealing systems where exposed contacting metal/metal joints are avoided, is desirable in such structures for ease of maintaining sterility.

A further example of the invention is illustrated in FIG. 11 (which is not to scale). A ring 22 or 36 cm outside diameter and 10 mm thickness was welded to a short length of a pipe 2 of wall thickness 10 mm and nominal outside diameter 30 cm by a weld 12 so that 15 mm of the pipe 2 projected through ring 22. Ring 22, pipe 2, and weld 12 were all made of carbon steel type ASTM A106 B. A short length of a stainless steel (Sandvik 3 RE 60) pipe 1 of similar dimensions to pipe 2 was welded to the end of pipe 2 projecting through ring 22 using a weld metal 3 (Inconel 182) recommended for welding the stainless steel Sandvik 3 RE 60 to carbon steel. No knife-line corrosion is liable to occur between the Sandvik 3 RE 60 and the Inconel 182 weld metal. After welding pipe 1 to pipe 2, a 3 mm thick layer 23 of stainless steel type 316 was applied by welding over weld metal 3, over the projecting portion of pipe 2 and over the face 24 of ring 22 nearer the projecting end of pipe 2. No knife-line corrosion is liable to occur between the Inconel 182 weld metal 3 and the stainless steel type 316.

The resultant jointing section of pipe was then used to connect a pipe 19 to a stainless steel (Sandvik 3 RE 60) pipe 18 of similar dimensions to pipes 1 and 2. Pipe 2 was welded to pipe 19 by weld 21, and pipe 19 were of carbon steel type ASTM A 106 B. Pipe 1 was welded to pipe 18 using a weld 20 of stainless steel (AVESTA 3 RE 60 PW) recommended for welding together Sandvik Stainless steel 3 RE 60. No knife-line corrosion is liable to occur between AVESTA 3 RE 60 PW and Sandvik 3 RE 60.

The welded structure was designed to have a service life of 15 years of exposure of the exterior surface of the pipes to an aerated aqueous mineral salts containing fermentation medium at 35° C. During the design life, the expected corrosion of pipe 19 and pipe 2 is a reduction in wall thickness of about 3 mm. At the same time, knife-line corrosion to the extent of about 30 mm between the stainless steel type 316 and the carbon steel is expected. As the knife-line corrosion pathway from the metal/metal junction 25 exposed to the corrosive environment at the rim of ring 22 to the load bearing region of weld 3 has a length of about 45 mm, it is seen that the knife-line corrosion will not reach weld 3 during the intended service life of the structure.

I claim:

1. A welded structure for use in a corrosive environment including a weld between components formed from metals of a knife-line corrodable combination in which each path liable to knife-line corrosion, from the corrosive environment to each metal-metal interface that is liable to knife-line corrosion in the load bearing region of the weld,
(A) has a length at least equal to the anticipated extent of knife-line corrosion along that path during the design life of the structure, and
(B) comprises a continuously welded interface between:
   1. a substrate consisting of:
      (a) the surface of one of said components between the weld and an appendage that is
         (i) integral with said one component, or
         (ii) welded to said one component with a weld metal that forms a knife-line corrodable combination neither with the metal of said appendage nor with the metal of said one component, and
      (b) at least part of the surface of said appendage, and
   2. a layer of metal extending over said substrate from the weld between said components, said layer covering and being continuously fused to said substrate and being formed from a metal which forms a knife-line corrodable combination with the metal of said one component and with the metal of said appendage, so that the end of the path that is exposed to the corrosive environment is the junction between said layer and said appendage at the end of said layer.

2. A structure according to claim 1 wherein the appendage comprises one face of a bimetallic strip welded to said component, said one face being welded to the component by means of a weld metal that forms a knife-line corrodable combination with neither the metal of that one face nor with the metal of said component, while the metal of the other face of the bimetallic strip forms part of the layer extending from the appendage to the weld between said components.

3. A structure according to claim 1 wherein at least part of said layer is of the metal used to form the weld between said components or is of a metal that does not form a knife-line corrodable combination with the metal used to form the weld between the components.

4. A structure according to claim 1 wherein the metal used to form the weld between the components is one that does not form a knife-line corrodable combination with one of the components.

5. A structure according to claim 1 wherein one component is made from stainless steel and the other component is made from carbon steel.

6. A structure according to claim 1 wherein the length of each path liable to knife-line corrosion is at least 2 cm.

7. A welded structure including a first member formed from a first metal and a second member formed from a second metal connected together by a welded jointing structure according to claim 1, said jointing structure comprising a first component formed from said first metal welded to a second component formed from said second metal, said first member being welded to said first component by means of a weld metal that does not form a knife-line corrodable combination with said first metal and said second member being welded to said second component by means of a weld metal that does not form a knife-line corrodable combination with said second metal.

* * * * *